US012562083B2

(12) United States Patent
Rasmussen

(10) Patent No.: US 12,562,083 B2
(45) Date of Patent: Feb. 24, 2026

(54) FLAG ACTUATION SYSTEM FOR A LIGHTING FIXTURE

(71) Applicant: HARMAN PROFESSIONAL DENMARK APS, Aarhus N (DK)

(72) Inventor: Niels Jorgen Rasmussen, Egaa (DK)

(73) Assignee: Harman Professional Denmark APS, Aarhus N (DK)

( * ) Notice: Subject to any disclaimer, the term of this patent is extended or adjusted under 35 U.S.C. 154(b) by 463 days.

(21) Appl. No.: 18/295,740

(22) Filed: Apr. 4, 2023

(65) Prior Publication Data

US 2023/0316958 A1 Oct. 5, 2023

(30) Foreign Application Priority Data

Apr. 5, 2022 (EP) .................................... 22166687

(51) Int. Cl.
*G09F 17/00* (2006.01)
*F21V 21/30* (2006.01)
*G09F 11/10* (2006.01)

(52) U.S. Cl.
CPC .............. *G09F 17/00* (2013.01); *F21V 21/30* (2013.01); *G09F 11/10* (2013.01)

(58) Field of Classification Search
CPC .......... G09F 17/00; G09F 11/10; F21V 21/30; F21V 9/08; F21V 14/08; F21V 17/02; F21V 17/105; F21W 2131/406
See application file for complete search history.

(56) References Cited

U.S. PATENT DOCUMENTS 6,241,366 B1 * 6/2001 Roman ................ G02B 26/007 362/322
2009/0231854 A1 9/2009 Jurik
2009/0323322 A1 * 12/2009 Lee ........................... F21V 9/40 362/231
2018/0283632 A1 * 10/2018 Rasmussen .......... G03B 21/001
2020/0371341 A1 11/2020 Wu

FOREIGN PATENT DOCUMENTS

DE 803846 C 4/1951

OTHER PUBLICATIONS

Extended European Search Report, EP application No. 22166687.8, dated Sep. 28, 2022, 5 pages.

* cited by examiner

*Primary Examiner* — Sonji N Johnson
(74) *Attorney, Agent, or Firm* — Artegis Law Group, LLP

(57) ABSTRACT

A flag actuation system for a lighting fixture is disclosed. The flag actuation system includes an actuator, an actuator axle connected to and drivable by the actuator, and at least two flags, each flag being movable between a first position in which the flag is arranged in an optical path defined by the flag actuation system, and a second position in which the flag is arranged out of the optical path. Each flag is individually and detachably connectable to the actuator axle via a magnetic actuator connection, and each flag is retainable in the first position using a first magnetic retaining connection and in the second position using a second magnetic retaining connection.

15 Claims, 10 Drawing Sheets

FLAG ACTUATION SYSTEM FOR A LIGHTING FIXTURE

CROSS-REFERENCES TO RELATED APPLICATIONS

This application claims the priority of co-pending European patent application titled "A FLAG ACTUATION SYSTEM FOR A LIGHTING FIXTURE," filed on Apr. 5, 2022, and having application number EP 22166687.8. The subject matter of this related application is hereby incorporated herein by reference.

FIELD OF THE VARIOUS EMBODIMENTS

The present disclosure relates to a flag actuation system for a lighting fixture. The flag actuation system is highly flexible as well as cost effective to manufacture. The disclosure further relates to a lighting fixture with such a flag actuation system, and to a method for controlling such a flag actuation system.

BACKGROUND

In lighting fixtures, such as automatic lighting fixtures, multiple flags driven by actuators are used to form and colour the light. Actuators, such as stepper motors, are among the most expensive components of lighting fixtures. Furthermore, the actuators add weight to the lighting fixture and occupy the limited space available in the lighting fixture.

In some prior art lighting fixtures, each beam forming flag is driven by a separate actuator. This allows each flag to be moved independently of the other flags, thereby providing high flexibility with regard to which flags to position in the light beam, and thereby with regard to forming and colouring the light. However, this comes at the price of added costs, weight and volume of the multiple actuators.

SUMMARY

Embodiments of the present disclosure provide a flag actuation system for a lighting fixture, which is highly flexible without introducing high manufacturing costs. According to a first aspect of the disclosure, a flag actuation system for a lighting fixture, the flag actuation system defining an optical path through the flag actuation system, and the flag actuation system comprising:

- an actuator,
- an actuator axle connected to and drivable by the actuator, and
- at least two flags, each flag being movable between a first position in which the flag is arranged in the optical path, and a second position in which the flag is arranged out of the optical path, wherein each flag is individually and detachably connectable to the actuator axle via a magnetic actuator connection, and each flag is retainable in the first position by means of a first magnetic retaining connection and in the second position by means of a second magnetic retaining connection.

Thus, according to the first aspect, the flag actuation system is of a kind which can be used in a lighting fixture. The flag actuation system defines an optical path through the flag actuation system. When the flag actuation system is mounted in a lighting fixture, a light beam generated by the lighting fixture will pass through the flag actuation system along the optical path. Accordingly, the optical path defines how the light travels through the flag actuation system.

The flag actuation system comprises an actuator and an actuator axle connected to and drivable by the actuator. Thus, when the actuator is operated, the actuator axle rotates accordingly. The actuator may, e.g., be or comprise a motor, such as a stepper motor.

The flag actuation system further comprises at least two flags. Each flag is movable between a first position in which the flag is arranged in the optical path, and a second position in which the flag is arranged out of the optical path. Thus, the first and second positions represent extremities of the allowed movements of the flags, and each of the flags is allowed to move into and out of the optical path. It should be noted that, since the flags are allowed to move between the first position and the second position, a given flag may be positioned at any position between the first and second positions, at a given point in time, e.g. because the flag is in the process of moving between the first and second positions, or because it is simply positioned there.

The flags may, e.g., include or be provided with frosted glass, beam shaper glass, colour filter, a gobo pattern, or any other relevant feature being suitable for forming or colouring a light beam. Thus, when a flag is arranged in the optical path, the feature defined by that flag is applied to a light beam passing through the optical path of the flag actuation system.

Each flag is individually and detachably connectable to the actuator axle via a magnetic actuator connection. Accordingly, each of the at least two flags is connectable to one and the same actuator, via the actuator axle, and each of the at least two flags can thereby be moved between the first and the second positions by appropriately operating the actuator. Thus, a separate actuator is not required for each flag, and thereby the manufacturing costs and the weight of the flag actuation system are reduced as compared to prior art flag actuation systems.

Since the flags are individually connectable to the actuator axle, each of the flags can be connected the actuator axle completely independently of whether or not any of the other flags are connected to the actuator axle. Thereby it is possible to move any of the flags or any combination of flags into or out of the optical path, thereby obtaining a flexibility which is essentially as good as if each of the flags had been connected to a separate actuator. The magnetic connections between the flags and the actuator axle, herein denoted the magnetic actuator connections, ensure that the connection between a given flag and the actuator axle is detachable, thereby allowing the actuator axle to move without moving that flag, if this should be desired.

Furthermore, each flag is retainable in the first position by means of a first magnetic retaining connection and in the second position by means of a second magnetic retaining connection. Thereby, when a flag has been moved to either the first position or the second position by means of the actuator, and the magnetic actuator connection between the flag and the actuator axle is disconnected, the flag will remain in the respective first or second position, due to the relevant magnetic retaining connection. This ensures that the actuator axle can subsequently be moved without moving the flag along. It also ensures that the flag remains in the desired position, even during movements of a moving head having the flag actuation system mounted therein, and the gravitational effects caused thereby, until the magnetic actuator connection is re-established in order to deliberately move the flag.

Accordingly, each of the at least two flags can be selectively and individually connected to the actuator axle of a single actuator, and thereby be moved along when the actuator axle is rotated due to operation of the actuator. Thereby a high flexibility in terms of combinations of flags being moved into or out of the optical path defined by the flag actuation system is obtained at low manufacturing costs and without increasing the weight of the flag actuation system.

The at least two flags may be mounted pivotally on the actuator axle. According to this embodiment, the actuator axle rotates relative to the flags when the flags are not connected to the actuator axle via the magnetic actuator connection, and the flags rotate along with the actuator axle when the magnetic actuator connection is established.

The magnetic actuator connection may comprise an adapter part mounted fixedly on the actuator axle, the adapter part thereby moving along with the actuator axle during operation of the actuator, the adapter part having at least one magnet mounted thereon, an angular position of the actuator axle and the adapter part thereby defining angular position of the at least one magnet relative to an initial angular position.

According to this embodiment, the flags are connected to the actuator axle by means of the adapter part. The adapter part is fixedly connected to the actuator axle, and thereby moves along when the actuator axle is rotated by appropriately operating the actuator. When a given flag is connected to the adapter part, it is thereby also connected to the actuator axle.

The adapter part has at least one magnet mounted thereon. When the adapter part rotates along with the actuator axle, the position of each magnet will also be moved accordingly. Thus, when the actuator axle rotates, due to appropriate operation of the actuator, the adapter part, as well as the at least one magnet mounted thereon, performs a rotating or angular movement. Accordingly, an angular position of the actuator axle and the adapter part defines an angular position of each of the at least one magnet mounted on the adapter part, relative to an initial angular position. The initial angular position may be an arbitrary starting position, a position which may be considered neutral with regard to operation of the flag actuation system, or any other suitable kind of initial position. The angular movements may be performed relative to an aperture plate forming part of the flag actuation system, the aperture plate having an aperture formed therein which forms part of the optical path through the flag actuation system.

The at least one magnet mounted on the adapter part may be applied for establishing magnetic actuator connections to the flags, when the magnet(s) is/are arranged in specified angular positions. Thus, the angular position of the at least one magnet may be decisive for whether or not a magnetic actuator connection can be established with a given flag.

Each flag may have at least one actuator magnet mounted thereon, and a given flag may be magnetically connected to the adapter part when the adapter part is arranged in an angular position where one of the magnets of the adapter part is aligned with an actuator magnet of the flag.

According to this embodiment, the manner in which the magnets are positioned on the adapter part and on the flags determines which angular positions of the adapter part result in alignment of a magnet on the adapter part and an actuator magnet on a given flag, and which thereby results in the flag being magnetically connected to the adapter part, thereby allowing the flag to be moved along when the actuator axle and the adapter part are rotated.

According to one embodiment, the adapter part may have at least two magnets mounted thereon, and each flag may have at least one actuator magnet mounted thereon. In this case, an actuator magnet mounted on a given flag may be magnetically connected to the adapter part by aligning the actuator magnet with any of the magnets mounted on the adapter part. Thereby a magnetic actuator connection can be established to a given flag in at least two different angular positions of the adapter plate. This allows for selectively connecting various combinations of flags to the adapter part.

As an alternative, the adapter part may have only one magnet mounted thereon, and each flag may at least two actuator magnets mounted thereon. This will also allow each flag to be magnetically connected to the adapter part at two or more different angular positions, thereby allowing for selective connection of various combinations of flags to the adapter part, similar to the embodiment described above.

The magnets of the adapter part and the actuator magnets of the flags may be arranged with substantially identical distance to the actuator axle, e.g. with substantially identical radial distance to the actuator axle. According to this embodiment, the magnets are essentially arranged on a circle. Thereby it is ensured that a given magnet mounted on the adapter part can be aligned with any actuator magnet mounted on any of the flags, simply by moving the adapter part to an appropriate angular position.

A position of the actuator magnet on a first flag may differ from a position of the actuator magnet on a second flag. According to this embodiment, when the actuator magnet of the first flag is aligned with a specific magnet of the adapter part, then the actuator magnet of the second flag will not be arranged in alignment with the same magnet of the adapter part. Thus, if the first flag as well as the second flag are to be connected to the adapter part, then their respective actuator magnets need to be aligned with separate magnets of the adapter part. Thereby it is possible to select angular positions of the adapter part where none of the flags are connected to the adapter part, only the first flag is connected to the adapter part, only the second flag is connected to the adapter part, and the first flag as well as the second part is connected to the adapter part, respectively.

Thus, the positions of the actuator magnets on the flags may determine angular positions of the adapter part where the respective actuator magnets are aligned with a magnet of the adapter part, the positions of the actuator magnets on the flags thereby defining angular positions of the adapter part where the respective flags are magnetically connected to the adapter part.

The flag actuation system may further comprise a first mechanical end stop and a second mechanical end stop, and the flags may abut the first mechanical end stop when they are in the first position, and the flags may abut the second mechanical end stop when they are in the second position.

According to this embodiment, the flags are physically restricted from moving beyond the first and second positions, respectively, due to the flags abutting the first and second mechanical end stops. In the case that the flags are magnetically connected to an adapter part, as described above, further movement of the adapter part when a flag has reached the first or second position may cause the magnetic connection between the flag and the adapter part to be disrupted, e.g. because the relevant magnets are moved out of alignment.

The first mechanical end stop and the second mechanical end stop may be separate structures, e.g. arranged on opposite sides of a zone in which the flags are allowed to move. In this case the mechanical end stops may be in abutment with side edges of the flags when the flags are in the first and second positions, respectively.

As an alternative, the first mechanical end stop and the second mechanical end stop may form part of a single structure, e.g. protruding through openings, e.g. in the form of slits, formed in the flags. In this case the mechanical end stop may be in abutment with oppositely arranged edges of the openings when the flags are in the first and second positions, respectively.

The first mechanical end stop and/or the second mechanical end stop may be at least partly made from a magnetic or magnetisable material, and each flag may comprise a first retaining magnet establishing the first magnetic retaining connection with the first mechanical end stop when the flag is in the first position and a second retaining magnet establishing the second magnetic retaining connection with the second mechanical end stop when the flag is in the second position.

According to this embodiment, when a given flag is arranged in abutment with one of the mechanical end stops, a magnetic retaining connection is established between the flag and the mechanical end stop, due to the relevant retaining magnet, and because the mechanical end stop is either magnetic or magnetisable. Thereby the flag is not only prevented from moving beyond the mechanical end stop, it is also magnetically retained in abutment with the mechanical end stop.

It should be noted that, in the case that the mechanical end stops are made from a magnetic material, it should be ensured that the magnetic force between the magnetic material of the end stops and the retaining magnets on the flags is an attractive force.

A magnetic force defined by the magnetic actuator connection may be larger than a magnetic force defined by the first magnetic retaining connection and larger than a magnetic force defined by the second magnetic retaining connection.

According to this embodiment, if a given flag is magnetically connected to the actuator axle, via an established magnetic actuator connection, and the flag is also magnetically retained at the first position or the second position, then movements of the actuator axle will cause the magnetic retaining connection to be disrupted, while the magnetic actuator connection is maintained. Thereby the flag will be moved along with the actuator axle, away from the first or second position, where it was previously retained.

The flag actuation system may comprise at least three flags. In the case that the flag actuation system is of a kind which comprises an adapter part with one or more magnets mounted thereon, this may require and additional adapter plate for each additional flag more than two, in order to ensure that all possible combinations of flags can be connected to the actuator axle.

The flag actuation system may further comprise position determining means for determining the position of the flags and/or the actuator axle.

According to this embodiment, it is possible to keep track of the exact position of the flags and/or the actuator axle. This may be relevant in order to plan how to operate the actuator in order to cause the flags to move in a desired manner. The position determining means may, e.g., be or comprise a Hall sensor, an optical sensor or switch, or any other suitable kind of device being capable of determining the position of a moving part.

The position determining means may be applied for resetting the system, in order to ensure that the flags are at a given position of the actuator. During operation, it can be checked whether or not the flag is where it is supposed to be, i.e. the actual position may be checked 'on the fly'.

The position determining means may be arranged in one position, in which case the position of a flag is determined when it passes the position of the position determining means. This is a cost effective way of keeping track of the positions of the flags. As an alternative, the absolute positions of the flags may be determined continuously or very frequently, such as several times per second.

According to a second aspect of the disclosure, a lighting fixture comprises a base, a yoke and a head, the head including a light source, a gate, a zoom and focus system, an exit lens, and a flag actuation system. The lighting fixture may, e.g., be in the form of a moving head. Since the lighting fixture according to these embodiments comprises a flag actuation system according to the previously described embodiments, the remarks set forth above with reference to the flag actuation system are equally applicable here. Furthermore, numerous beam forming systems, colour systems and/or pattern systems may be arranged in the optical path.

The light generated by the light source passes through the flag actuation system along the optical path defined by the flag actuation system, and thereby the light beam is formed and coloured in accordance with the features defined by the flags which have been moved into the optical path defined by the flag actuation system.

The flag actuation system may be arranged along an optical axis of the head, between the light source and the exit lens. For instance, the flag actuation system may be arranged between the light source and the zoom and focus system, or between the zoom and the focus.

According to a third aspect of the disclosure, a method for controlling a flag actuation system according to the first aspect, the method comprising the steps of:

- selecting a combination of zero or more flags to be arranged in the optical path defined by the flag actuation system,
- selecting a movement pattern of the actuator axle which results in the selected combination of flags being arranged in the optical path, and
- operating the actuator in order to cause the actuator axle to move in accordance with the selected movement pattern.

It should be noted that a person skilled in the art would readily recognise that any feature described in combination with the first or second aspects could also be combined with the third aspects, and vice versa.

In the method, it is initially decided which features are required for forming and/or colouring a light beam in a desired manner. A combination of zero or more flags is then selected, which will provide the desired result, when these flags are positioned in the optical path defined by the flag actuation system. Thus, at this point it has been established which flags need to be arranged in the optical path, and which flags need to be arranged out of the optical path. Assuming that it is also known which flags are currently positioned in the optical path and which are not, it can also be established which flags need to be moved into the optical path, which flags need to be moved out of the optical path, and which flags should remain where they are.

Next, a movement pattern of the actuator axle which results in the selected combination of flags being arranged in the optical path is selected. Accordingly, the selected movement pattern ensures that the flags which need to be moved into or out of the optical path are moved appropriately, and in accordance with the findings in the previous step.

The selected movement pattern may, e.g., be in the form of a sequence of clockwise and/or counter-clockwise movements, e.g. in the form of steps of a specified length, of the actuator axle. For instance, the selected movement pattern may ensure that the flags which need to be removed are magnetically connected to the actuator axle, and subsequently moved along with the actuator axle until they are positioned in or out of the optical path, as required.

The step of selecting a movement pattern may comprise selecting the movement pattern among a set of predefined movement patterns.

According to this embodiment, movement patterns which result in specific movements of the flags can be derived upfront, possibly even before the flag actuation system is put into operation. When a specific combination of flags is required during operation, the relevant movement pattern can simply be selected from the set of predefined movement patterns. This allows fast operation of the flag actuation system with low processing power.

BRIEF DESCRIPTION OF THE DRAWINGS

The disclosure will now be described in further detail with reference to the accompanying drawings in which.

DETAILED DESCRIPTION OF THE DRAWINGS

Figure 1:
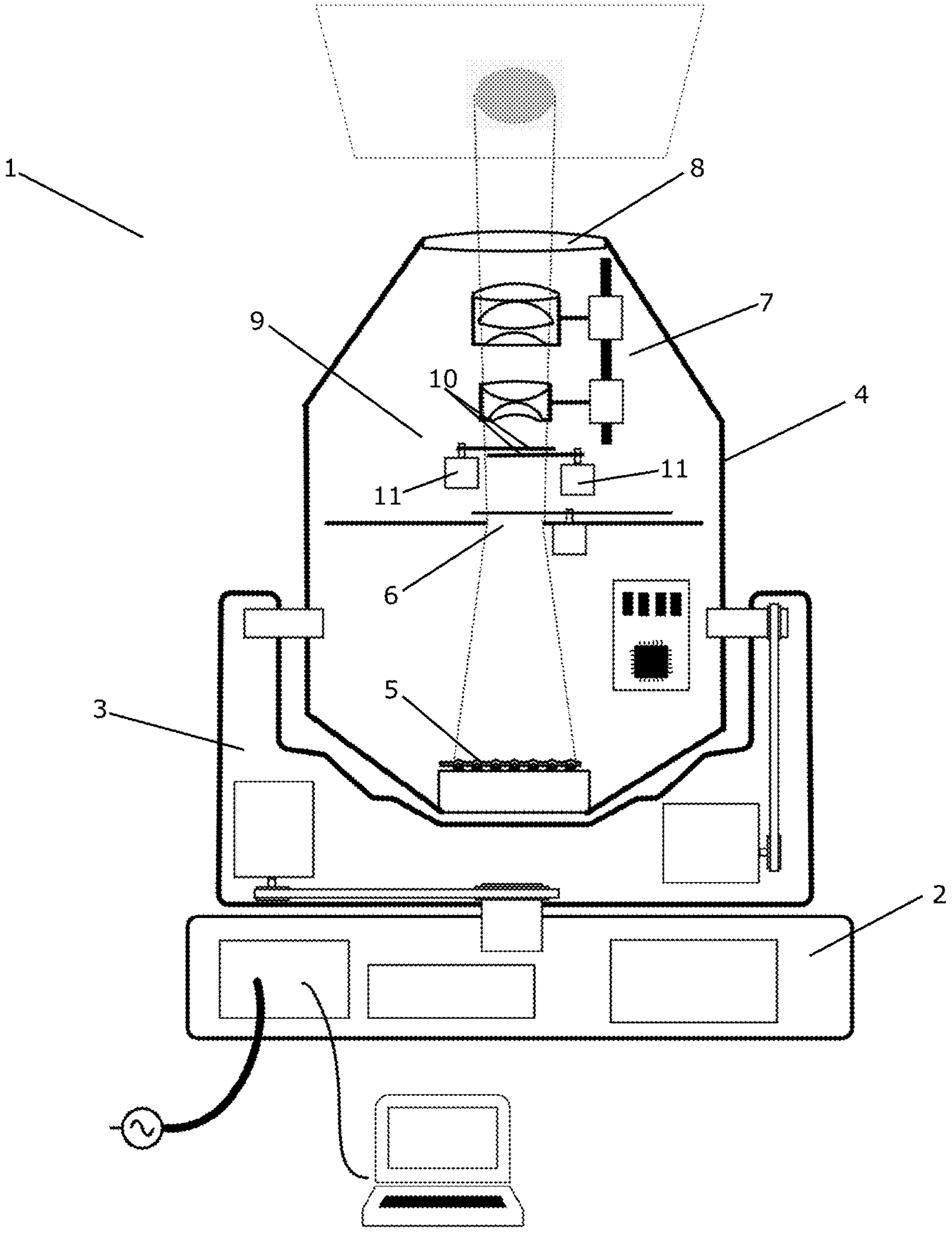
Fig. 1 Prior art
FIG. 1 is a cross sectional view of a prior art lighting fixture.

FIG. 1 is a cross sectional view of a prior art lighting fixture 1, in the form of a moving head. The lighting fixture 1 comprises a base 2, a yoke 3 and a head 4. The head 4 includes a light source 5, in the form of a plurality of LEDs, a gate 6, a zoom and focus system 7 and an exit lens 8. Light generated by the light source 5 passes through the gate 6 and the zoom and focus system 7 and exits the head 4 via the exit lens 8, thereby defining an optical path through the head 4.

The head 4 further includes a prior art flag actuation system 9 arranged in the optical path between the gate 6 and the zoom and focus system 7. The prior art flag actuation system 9 comprises two flags 10, each being connected to a separate actuator 11, in the form of a motor. Thus, each of the flags 10 can be moved into or out of the optical path independently of movements of the other flag 10. However, this flexibility requires the presence of the two separate actuators 11, thereby adding to the manufacturing costs and the weight of the lighting fixture 1.

Figure 2:
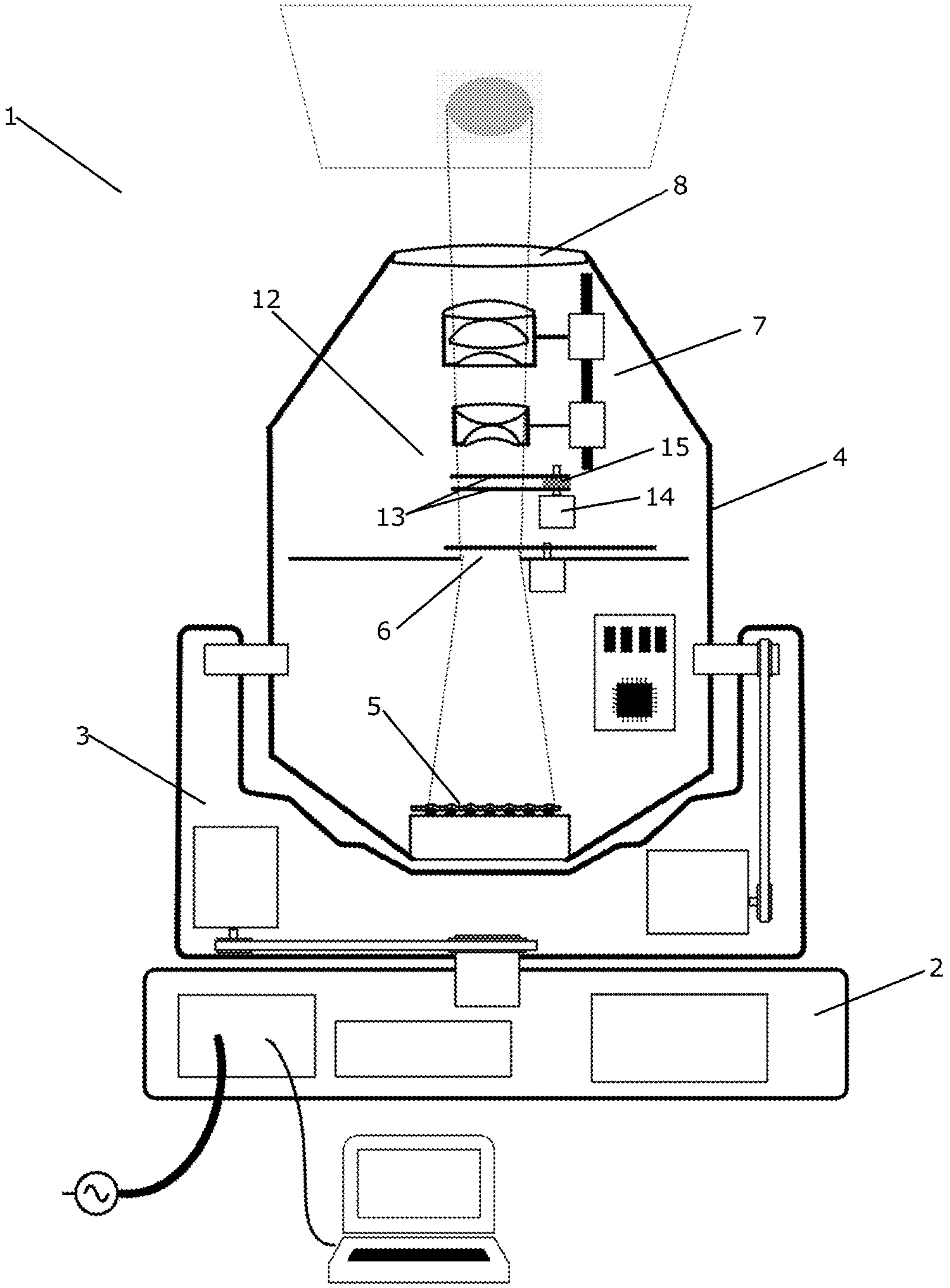
FIG. 2 is a cross sectional view of a lighting fixture according to some embodiments.

FIG. 2 is a cross sectional view of a lighting fixture 1 according to some embodiments. The lighting fixture 1 of FIG. 2 is identical to the prior art lighting fixture of FIG. 1, except that the prior art flag actuation system 9 has been replaced by a flag actuation system 12 according to an embodiment. The flag actuation system 12 comprises two flags 13. Each flag 13 is individually and detachably connectable to a single actuator 14 by means of a magnetic actuator connection 15. Thereby each of the flags 13 can be moved into or out of the optical path, independently of movements of the other flag 13 but by means of only one actuator 14. Thereby the flexibility of the prior art flag actuation system 9 illustrated in FIG. 1 is maintained, but the manufacturing costs and the weight of the lighting fixture 1 are reduced.

Figure 3:
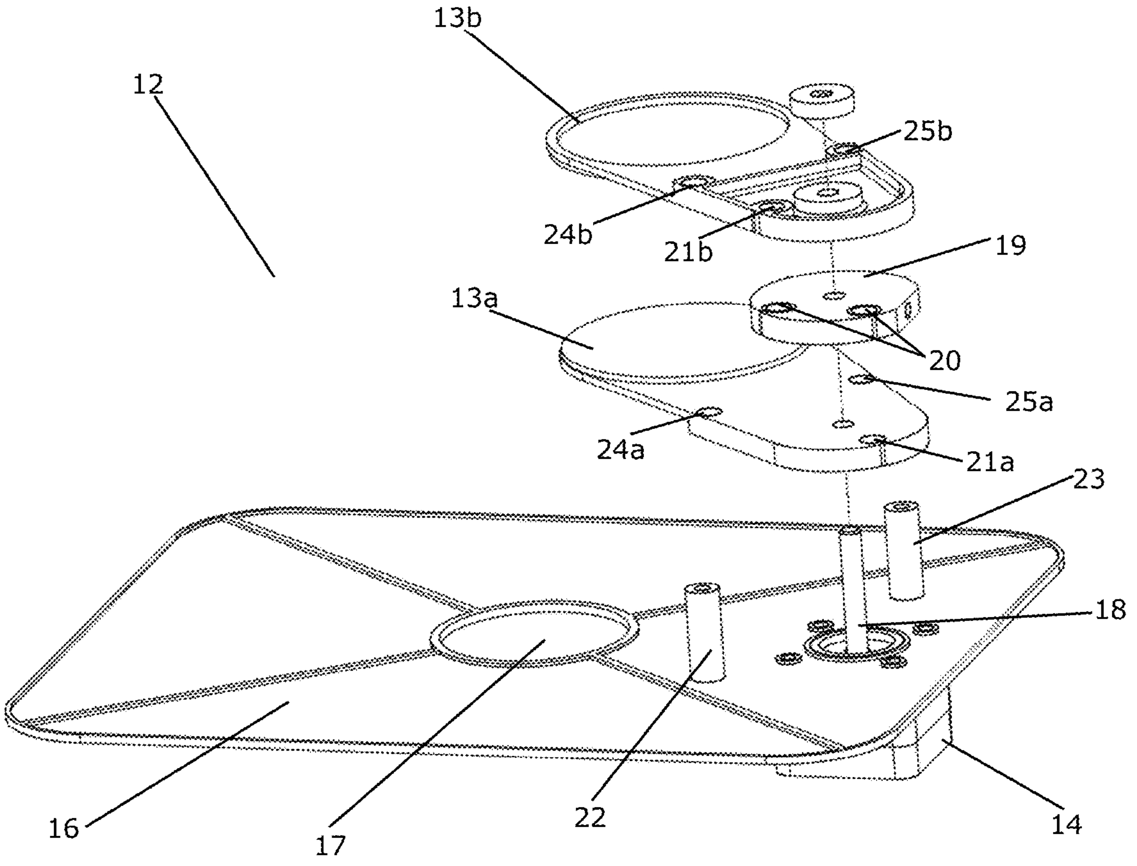
FIG. 3 is an exploded view of a flag actuation system according to a first embodiment.

FIG. 3 is an exploded view of a flag actuation system 12 according to a first embodiment. The flag actuation system 12 comprises an aperture plate 16 defining an aperture 17. When the flag actuation system 12 is positioned in a lighting fixture, the aperture 17 is arranged in the optical path of the lighting fixture. Thereby the aperture 17 defines an optical path through the flag actuation system 12.

The flag actuation system 12 further comprises an actuator 14 and an actuator axle 18 which is connected to and drivable by the actuator 14. Accordingly, when the actuator 14 is operated, the actuator axle 18 performs corresponding rotating movements.

The flag actuation system 12 further comprises two flags **13*a*, 13*b*, each being mounted pivotally on the actuator axle 18, and each being magnetically connectable to the actuator axle 18, thereby allowing the flags 13*a*, 13*b* to move along with the actuator axle 18** when it performs rotating movements as described above. This will be described in further detail below.

An adapter part 19 is arranged between the flags **13*a*, 13*b*, and mounted fixedly on the actuator axle 18. Thus, when the actuator axle 18 performs rotating movements, the adapter part 19** always rotates along.

The adapter part 19 has two magnets 20 mounted thereon, and each of the flags **13*a*, 13*b* has an actuator magnet 21*a*, 21*b* mounted thereon. When the adapter part 19 is in an angular position where one of the magnets 20 is aligned with the actuator magnet 21*a*, 21*b* of one of the flags 13*a*, 13*b*, then a magnetic connection is established which connects that flag 13*a*, 13*b* to the adapter part 19, and thereby to the actuator axle 18. The flag 13*a*, 13*b* then moves along when the actuator axle 18** performs rotating movements.

It can be seen that the position of the actuator magnet **21*a* on flag 13*a* differs from the position of the actuator magnet 21*b* on flag 13*b*. Thereby the actuator magnets 21*a*, 21*b* will not be aligned with the same magnet 20 of the adapter part 19 simultaneously, i.e. at the same angular position of the adapter part 19. Thereby angular positions of the adapter part 19 exist, where zero, one or two of the flags 13*a*, 13*b* are magnetically connected to the adapter part 19. More specifically, the adapter part 19** can be positioned in angular positions where the following configurations are obtained:

1. None of the magnets 20 are aligned with an actuator magnet **21*a*, 21*b***.
2. One of the magnets 20 is aligned with actuator magnet **21*a*, but none of the magnets 20 are aligned with actuator magnet 21*b***.
3. One of the magnets 20 is aligned with actuator magnet **21*b*, but none of the magnets 20 are aligned with actuator magnet 21*a***.
4. One of the magnets 20 is aligned with actuator magnet **21*a* and the other of the magnets 20 is aligned with actuator magnet 21*b***.

In configuration (1) none of the flags **13*a*, 13*b* are connected to the actuator axle 18, and the actuator axle 18 can rotate without moving any of the flags 13*a*, 13*b***.

In configuration (2) flag **13*a* is connected to the actuator axle 18, but flag 13*b* is not connected to the actuator axle 18. Thus, flag 13*a* will rotate along when the actuator axle 18 performs rotating movements, and flag 13*b* will remain in its current position. Accordingly, in configuration (2), flag 13*a* can be moved as desired, independently of flag 13*b***.

Similarly, in configuration (3) flag **13*b* is connected to the actuator axle 18, but flag 13*a* is not connected to the actuator axle 18. Thus, flag 13***b* will rotate along when the actuator axle 18 performs rotating movements, and flag 13*a* will remain in its current position. Accordingly, in configuration (3), flag 13*b* can be moved as desired, independently of flag 13*a*.

In configuration (4) flag 13*a* as well as flag 13*b* is connected to the actuator axle 18. Accordingly, both flags 13*a*, 13*b* are rotated along with the actuator axle 18 simultaneously.

The flag actuation system 12 further comprises a first mechanical end stop 22 and a second mechanical end stop 23, the mechanical end stops 22, 23 being made from a magnetic or magnetisable material. The mechanical end stops 22, 23 prevent the flags 13*a*, 13*b* from moving further when they have been moved into abutment with one of the mechanical end stops 22, 23. Accordingly, the rotating movements of the flags 13*a*, 13*b* are limited to movements between a position where they abut the first mechanical end stop 22 and a position where they abut the second mechanical end stop 23. In the position where the flags 13*a*, 13*b* abut the first mechanical end stop 22, the flags 13*a*, 13*b* are arranged in complete overlap with the aperture 17, and thereby in the optical path through the flag actuation system 12. In the position where the flags 13*a*, 13*b* abut the second mechanical end stop 23, the flags 13*a*, 13*b* are arranged with no overlap with the aperture 17, and thereby completely out of the optical path through the flag actuation system 12. Thus, each of the flags 13*a*, 13*b* is movable between a first position in which it is arranged in the optical path and a second position in which it is arranged out of the optical path.

Each flag 13*a*, 13*b* is provided with a first retaining magnet 24*a*, 24*b* and a second retaining magnet 25*a*, 25*b*. When a flag 13*a*, 13*b* is arranged in abutment with the first mechanical end stop 22, a magnetic retaining connection is established between the first mechanical end stop 22 and the first retaining magnet 24*a*, 24*b* of that flag 13*a*, 13*b*, thereby retaining the flag 13*a*, 13*b* in the first position, at least if the magnetic connection between the flag 13*a*, 13*b* and the adapter part 19 is disrupted.

Similarly, when a flag 13*a*, 13*b* is arranged in abutment with the second mechanical end stop 23, a magnetic retaining connection is established between the second mechanical end stop 23 and the second retaining magnet 25*a*, 25*b* of that flag 13*a*, 13*b*, thereby retaining the flag 13*a*, 13*b* in the second position.

FIGS. 4-12 are perspective views of the flag actuation system 12 of FIG. 3 with the flags 13*a*, 13*b* in various positions.

Figure 4:
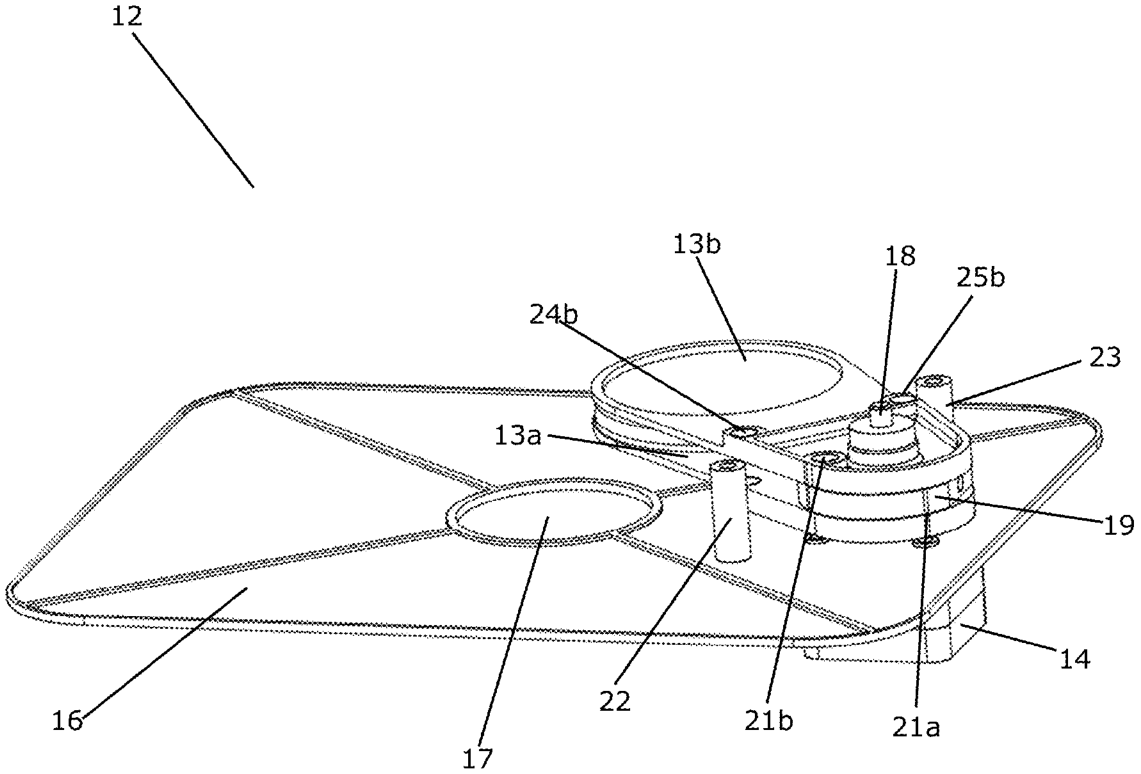
FIGS. 4-12 are perspective views of the flag actuation system of FIG. 3 with the flags arranged in various positions.

In FIG. 4 both of the flags 13*a*, 13*b* are arranged in the second position, i.e. in abutment with the second mechanical end stop 23 and completely out of the optical path. Furthermore, the adapter part 19 is in an angular position where the actuator magnet 21*a* of flag 13*a* as well as the actuator magnet 21*b* of flag 13*b* is arranged in alignment with one of the magnets (not visible in FIG. 4) of the adapter part 19. Accordingly, rotating movements of the actuator axle 18 will cause both of the flags 13*a*, 13*b* to rotate along.

Figure 5:
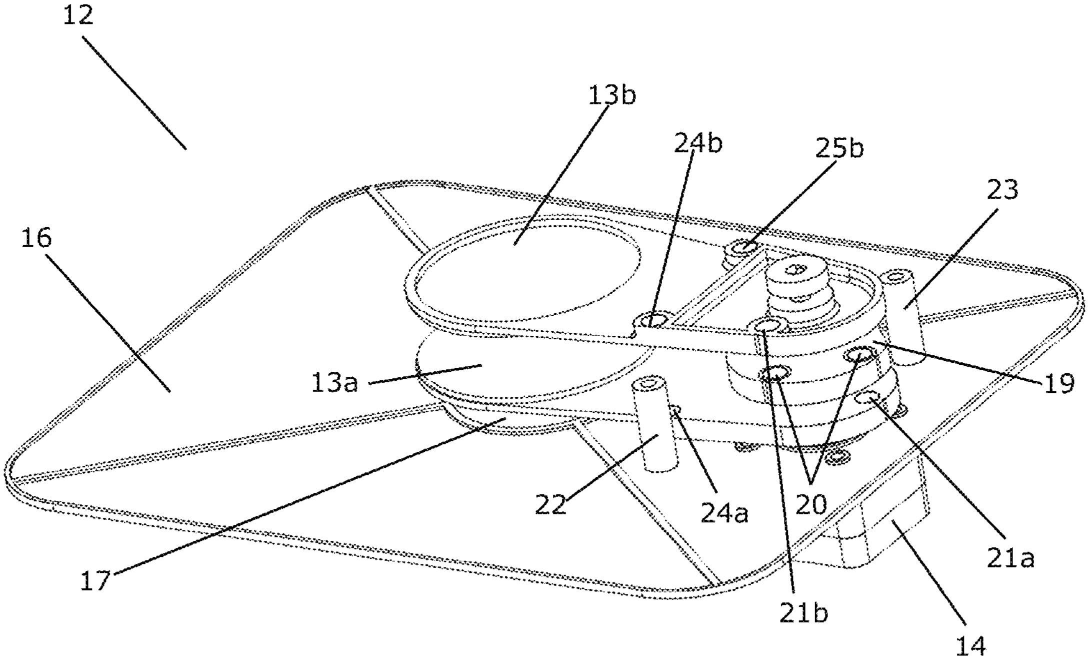
Figure 6:
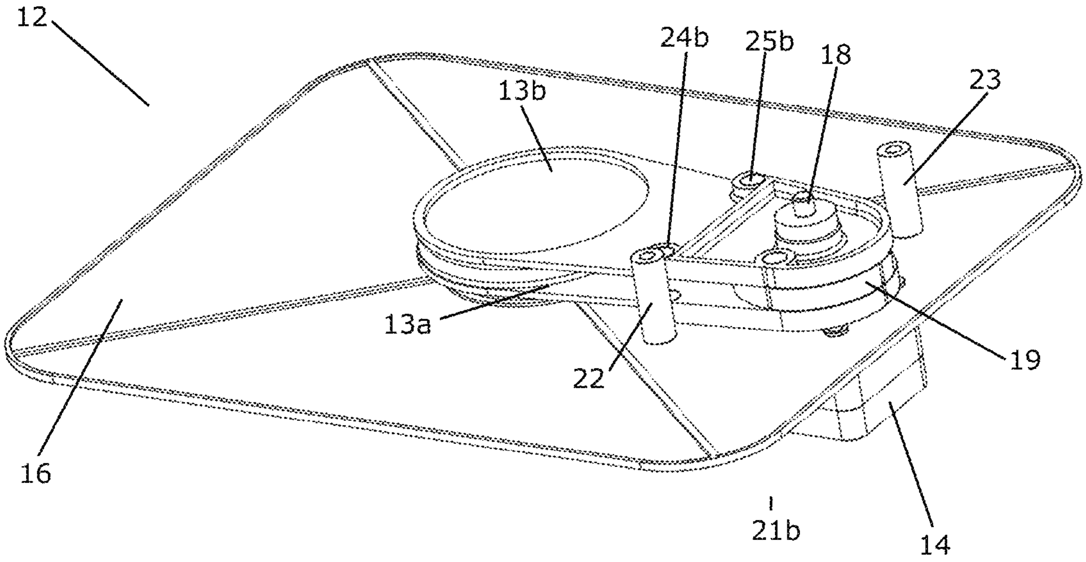

FIGS. 5 and 6 show the flags 13*a*, 13*b* in an alternative position. FIG. 5 is a slightly exploded view, in order to reveal more details, and FIG. 6 shows the flag actuation system 12 fully assembled.

In FIGS. 5 and 6, both of the flags 13*a*, 13*b* are arranged in the first position, i.e. in abutment with the first mechanical end stop 22 and completely in the optical path. Furthermore, similarly to the situation illustrated in FIG. 4, the actuator magnets 21*a*, 21*b* of each of the flags 13*a*, 13*b* is aligned with one of the magnets 20 of the adapter part 19, and thereby both of the flags 13*a*, 13*b* will move along when the actuator axle 18 rotates. Thus, the flags 13*a*, 13*b* have simply been moved simultaneously from the position shown in FIG. 4 to the position shown in FIGS. 5 and 6 by rotating the actuator axle 18.

Figure 7:
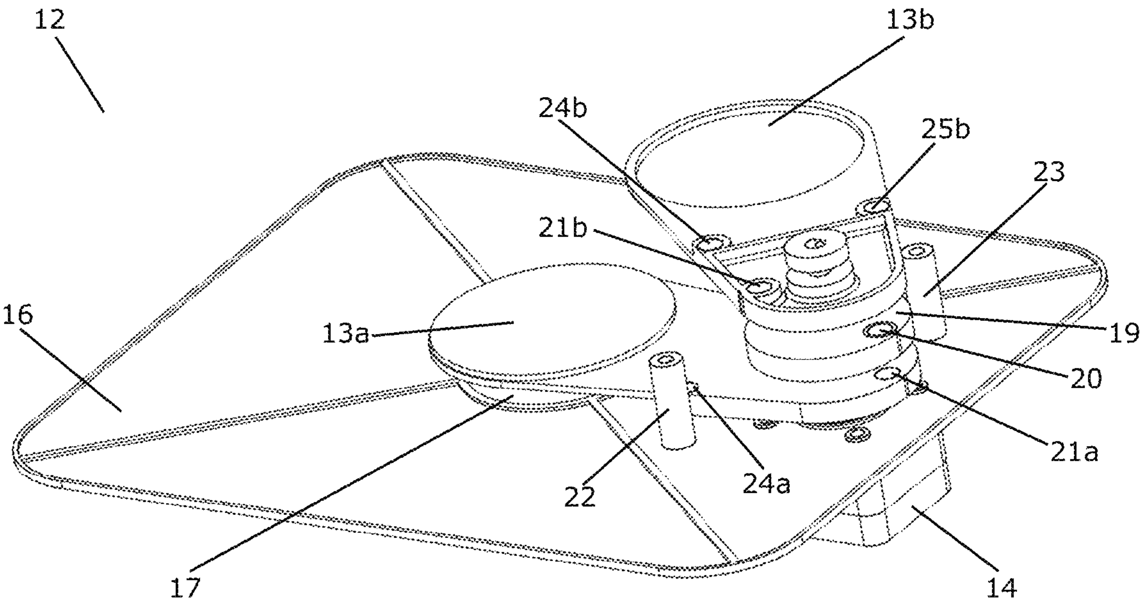
Figure 8:
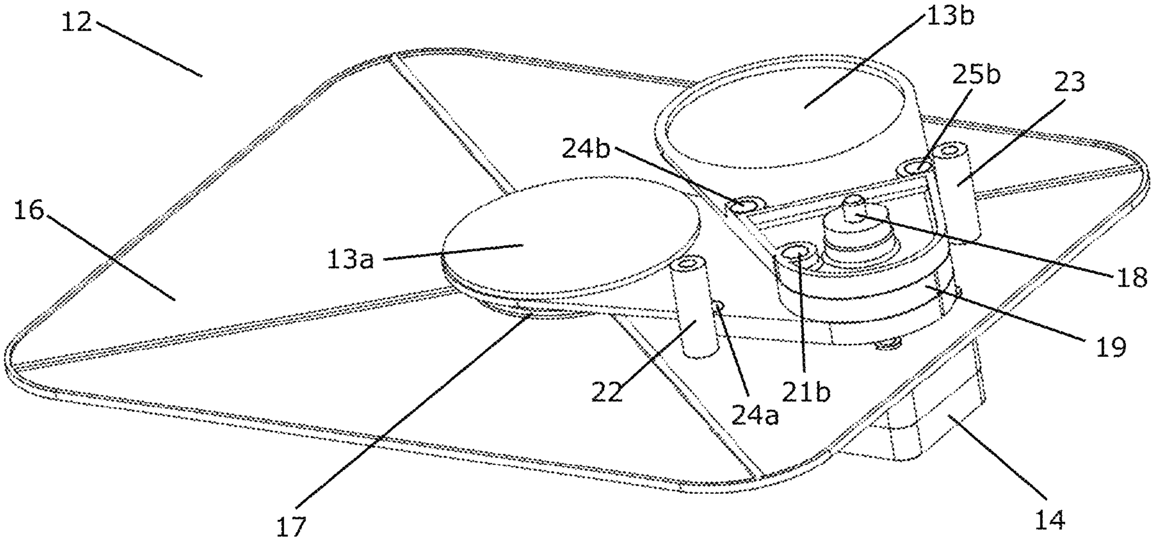

FIGS. 7 and 8 show the flags 13*a*, 13*b* in yet an alternative position, where FIG. 7 is a slightly exploded view and FIG. 8 shows the flag actuation system 12 fully assembled.

In FIGS. 7 and 8, one of the flags 13*a* is arranged in the first position, as described above with reference to FIGS. 5 and 6, and the other flag 13*b* is arranged in the second position, as described above with reference to FIG. 4. The adapter part 19 is in an angular position where one of the magnets 20 is aligned with the actuator magnet 21*a* of flag 13*a*. However, actuator magnet 21*b* of flag 13*b* is not aligned with a magnet 20 of the adapter part 19. Thus, when the actuator axle 18 rotates, flag 13*a* will move along, but flag 13*b* will remain in the first position.

Figure 9:
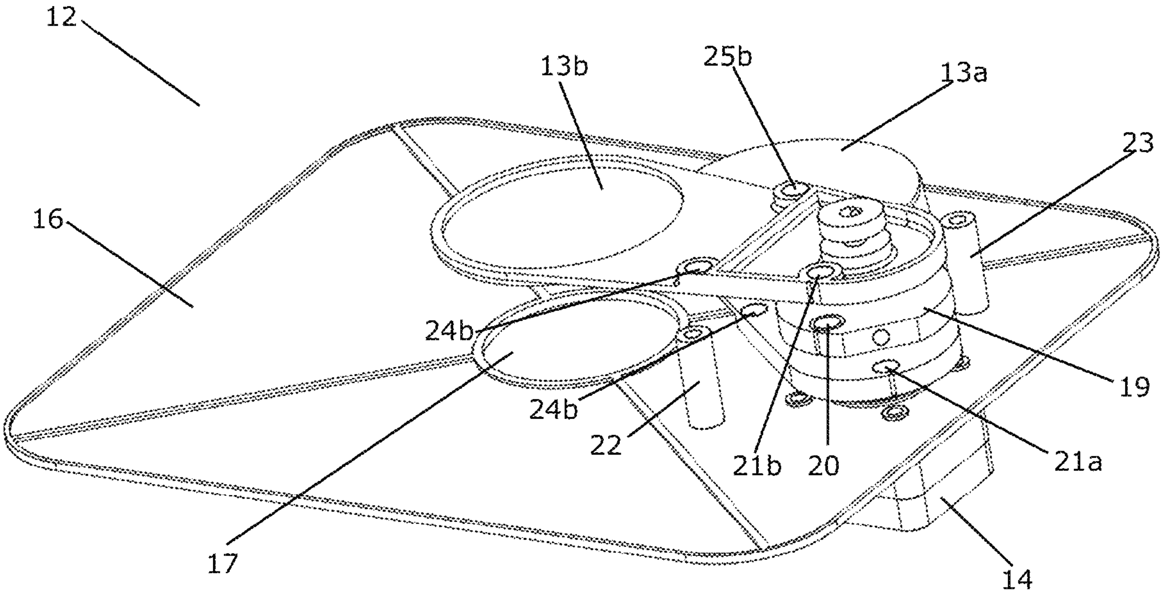
Figure 10:
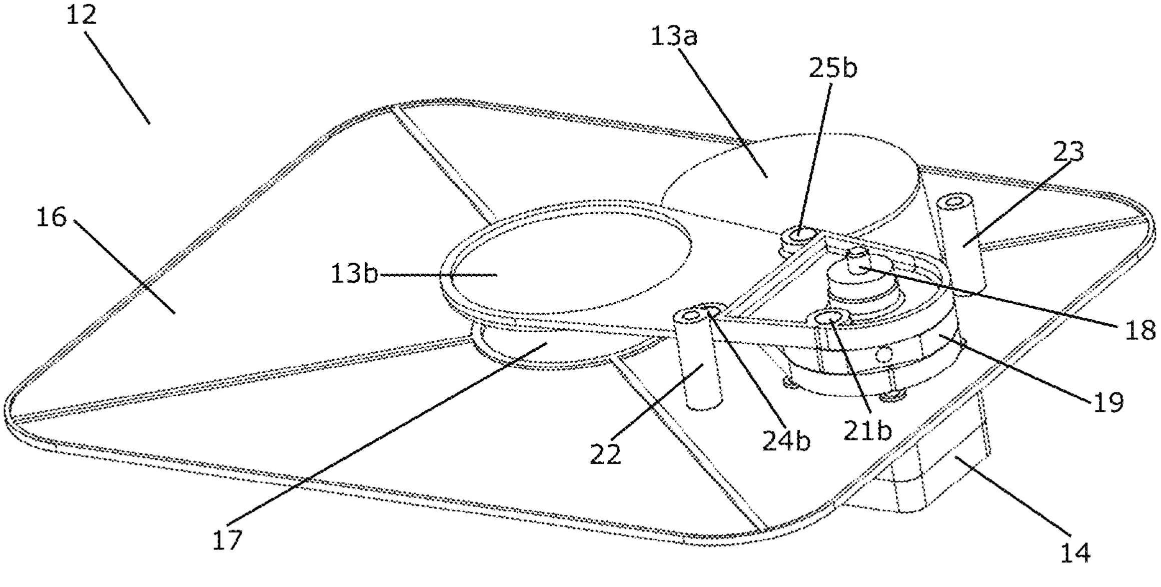

FIGS. 9 and 10 show the flags 13*a*, 13*b* in yet an alternative position, where FIG. 9 is a slightly exploded view and FIG. 10 shows the flag actuation system 12 fully assembled.

In FIGS. 9 and 10, flag 13*b* is arranged in the first position and flag 13*a* in arranged in the second position, i.e. the positions of the flags 13*a*, 13*b* are reversed as compared to the situation illustrated in FIGS. 7 and 8. The adapter part 19 is in an angular position where one of the magnets 20 is aligned with the actuator magnet 21*b* of flag 13*b*. However, actuator magnet 21*a* of flag 13*a* is not aligned with a magnet 20 of the adapter part 19. Thus, in the situation illustrated in FIGS. 9 and 10, it is flag 13*b* which will move along when the actuator axle 18 rotates, while flag 13*a* will remain in the second position.

Figure 11:
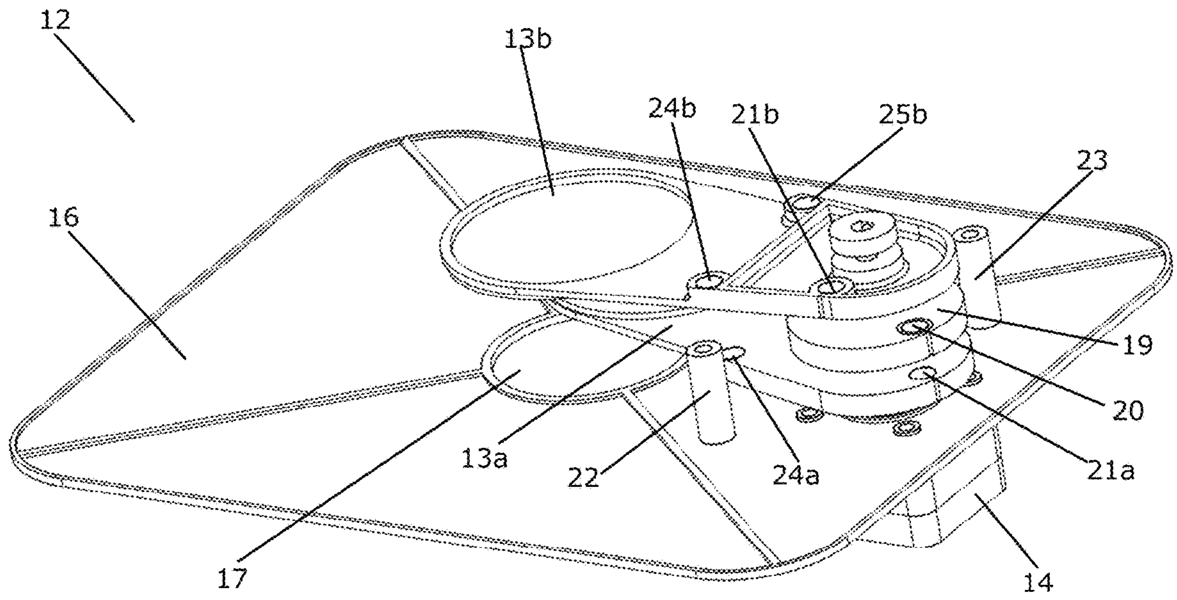
Figure 12:
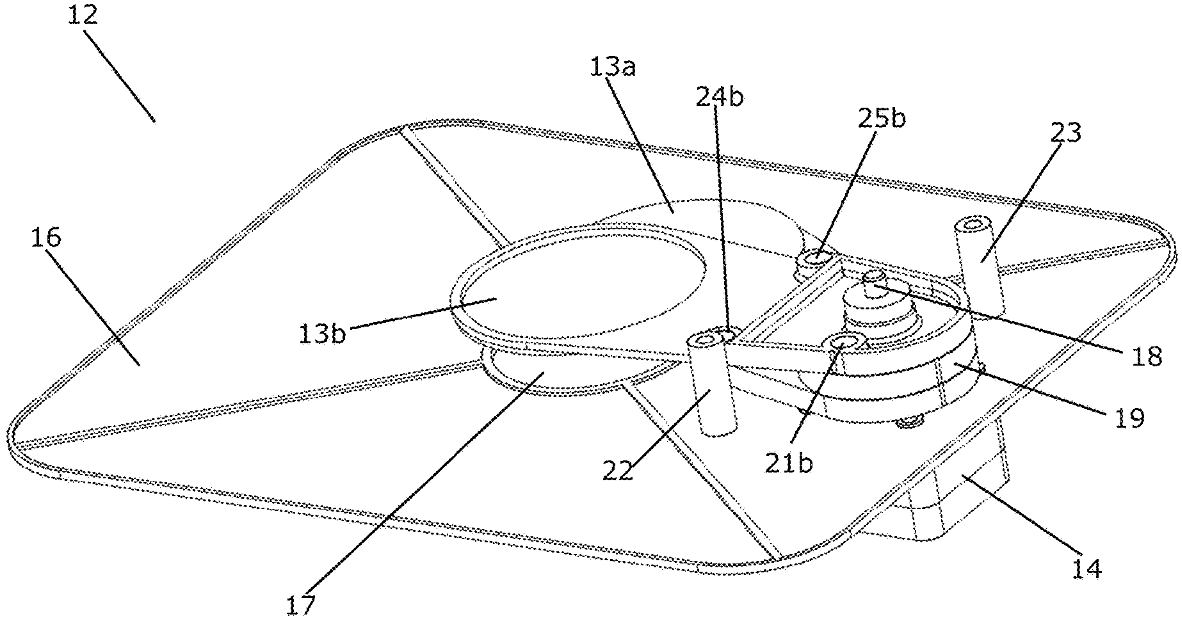

FIGS. 11 and 12 show the flags 13*a*, 13*b* in yet an alternative position, where FIG. 11 is a slightly exploded view and FIG. 12 shows the flag actuation system 12 fully assembled.

In FIGS. 11 and 12, flag 13*b* is arranged in the first position, and flag 13*a* is in an intermediate position between the first position and the second position. The adapter part 19 is in an angular position where one of the magnets 20 is aligned with actuator magnet 21*a* of flag 13*a*, and where none of the magnets 20 are aligned with actuator magnet 21*b* of flag 13*b*. Accordingly, flag 13*a* is moved along when the actuator axle 18 rotates, and flag 13*b* remains in the first position. Thus, flag 13*a* is in the process of being moved into or out of the optical path.

Figure 13:
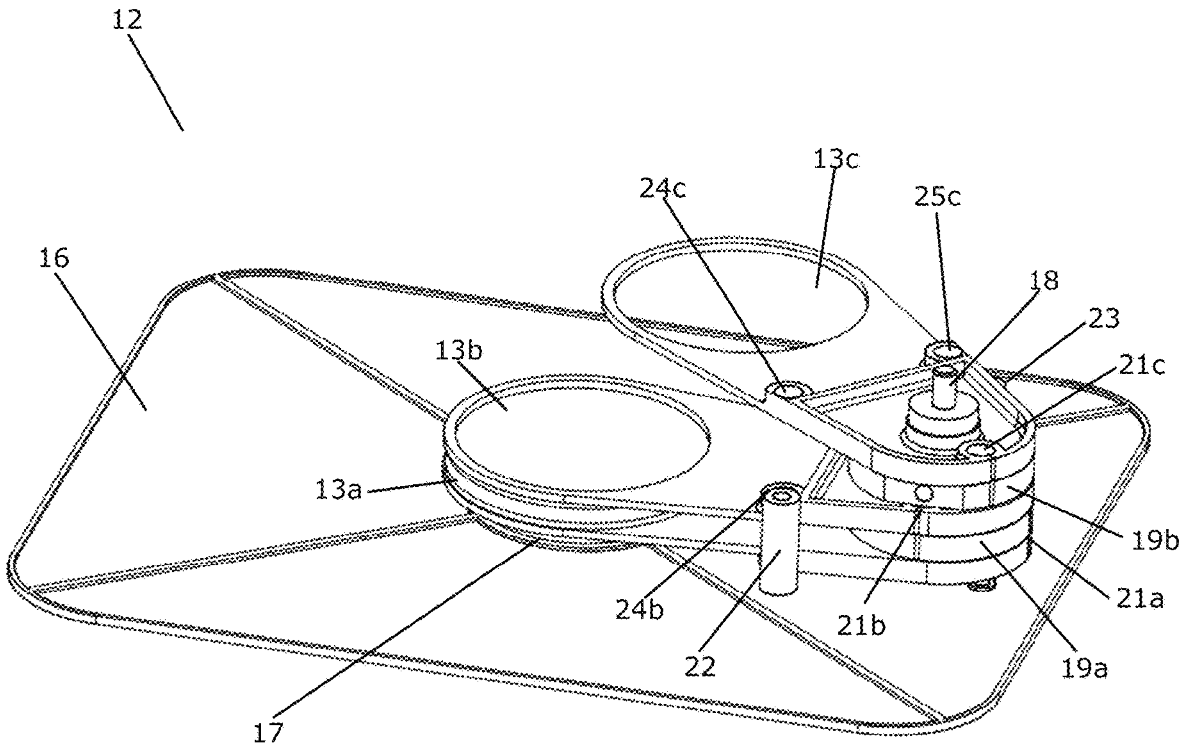
FIG. 13 is a perspective view of a flag actuation system according to a second embodiment.

FIG. 13 is a perspective view of a flag actuation system 12 according to a second embodiment. The flag actuation system 12 of FIG. 13 is very similar to the flag actuation system 12 illustrated in FIGS. 3-12, and it will therefore not be described in detail here. However, the flag actuation system 12 of FIG. 13 comprises three flags 13*a*, 13*b*, 13*c* and two adapter parts 19*a*, 19*b*. Adapter part 19*a* is arranged between flag 13*a* and flag 13*b*, and adapter part 19*b* is arranged between flag 13*b* and flag 13*c*. Flag 13*a* and flag 13*b* are arranged in the first position, and flag 13*c* is arranged in the second position.

Each of the adapter parts 19*a*, 19*b* has two magnets (not visible) mounted thereon, and each of the flags 13*a*, 13*b*, 13*c* has an actuator magnet 21*a*, 21*b*, 21*c* mounted thereon. One of the magnets of adapter part 19*b* is aligned with the actuator magnet 21*c* of flag 13*c*. One of the magnets of adapter part 19*a* is aligned with the actuator magnet 21*b* of flag 13*b*, and the other of the magnets of adapter part 19*a* is aligned with the actuator magnet 21*a* of flag 13*a*. Accordingly, all of the flags 13*a*, 13*b*, 13*c* are magnetically connected to the actuator axle 18.

If the actuator axle 18 is rotated in a clockwise direction, flag 13*c* will be retained by the second mechanical end stop 23, and adapter part 19*b* will rotate relative to flag 13*c*, thereby disrupting the magnetic connection between flag 13*c* and adapter part 19*b*. Simultaneously, flag 13*a* and 13*b* will be moved along with the actuator axle 18 towards the second position and out of the optical path.

If the actuator axle 18 is rotated in a counter-clockwise direction, flag 13*a* and flag 13*b* will be retained by the first mechanical end stop, and the magnetic connections between flags 13*a*, 13*b* and adapter part 19*a* will be disrupted, while flag 13*c* will move along with the actuator axle 18 towards the first position and into the optical path.

Figure 14:
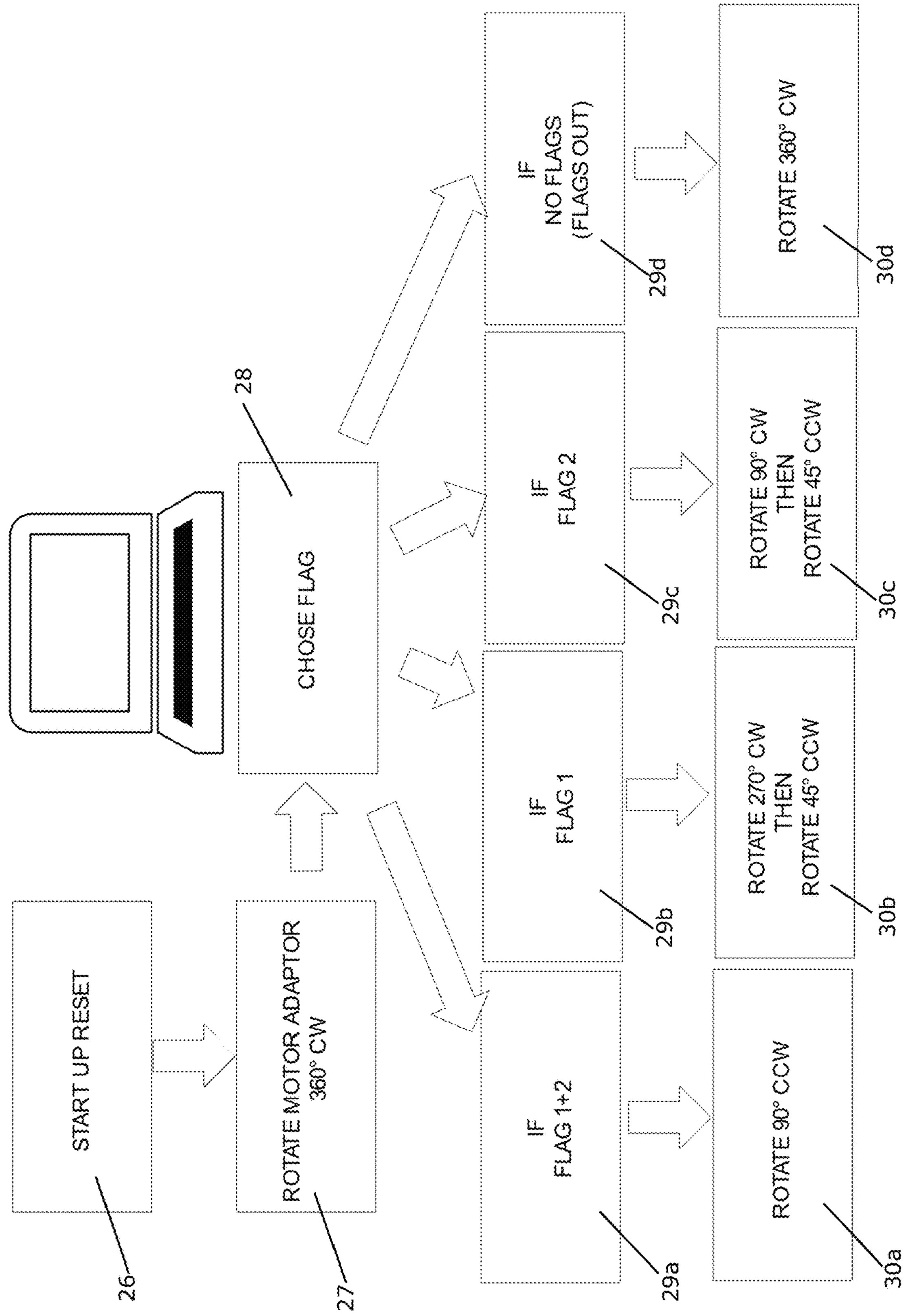
FIG. 14 illustrates a method for controlling a flag actuation system according to some embodiments.

FIG. 14 illustrates a method according to an embodiment for controlling a flag actuation system comprising two flags. The flag actuation system being controlled may, e.g., be the flag actuation system illustrated in FIGS. 3-12.

The process is started at step 26. At step 27 the actuator axle, and possibly an adapter part, is rotated 360°, in order to ensure that both flags are moved to a specified position and that none of the flags are magnetically connected to the actuator axle.

At step 28 a combination of flags to be arranged in the optical path is selected among four possible flag combinations 29*a*, 29*b*, 29*c*, 29*d*. Flag combination 29*a* specifies that both flags should be arranged in the optical path. Flag combination 29*b* specifies that only flag number 1 should be arranged in the optical path. Flag combination 29*c* specifies that only flag number 2 should be arranged in the optical path. Finally, flag combination 29*d* specifies that none of the flags should be arranged in the optical path.

Finally, a movement pattern 30*a*, 30*b*, 30*c*, 30*d* for the actuator axle is selected which results in the specified flag combination 29*a*, 29*b*, 29*c*, 29*d* being arranged in the optical path. The movement pattern 30*a*, 30*b*, 30*c*, 30*d* is selected from a set of predefined movement patterns 30*a*, 30*b*, 30*c*, 30*d*, where each is uniquely associated with a flag combination 29*a*, 29*b*, 29*c*, 29*d*.

If both flags should be arranged in the optical path, corresponding to flag combination 29*a*, then the actuator axle must be rotated 90° in a counter-clockwise direction, corresponding to movement pattern 30*a*.

If only flag number 1 should be arranged in the optical path, corresponding to flag combination 29*b*, then the actuator axle must initially be rotated 270° in a clockwise direction and subsequently rotated 45° in a counter-clockwise direction, corresponding to movement pattern 30*b*.

If only flag number 2 should be arranged in the optical path, corresponding to flag combination 29*c*, then the actuator axle must initially be rotated 90° in a clockwise direction and subsequently rotated 45° in a counter-clockwise direction, corresponding to movement pattern 30*c*.

If none of flags should be arranged in the optical path, corresponding to flag combination 29*d*, then the actuator axle must be rotated 360° in a clockwise direction, corresponding to movement pattern 30*d*.

The invention claimed is:

1. A flag actuation system for a lighting fixture, the flag actuation system defining an optical path through the flag actuation system, and the flag actuation system comprising:
- an actuator;
- an actuator axle connected to and drivable by the actuator; and
- at least two flags, each flag being movable between a first position in which the flag is arranged in the optical path, and a second position in which the flag is arranged out of the optical path;
- wherein each flag is individually and detachably connectable to the actuator axle via a magnetic actuator connection, and each flag is retainable in the first position by means of a first magnetic retaining connection and in the second position by means of a second magnetic retaining connection.

2. The flag actuation system according to claim 1, wherein the magnetic actuator connection comprises an adapter part mounted fixedly on the actuator axle, the adapter part thereby moving along with the actuator axle during operation of the actuator, the adapter part having at least one magnet mounted thereon, an angular position of the actuator axle and the adapter part thereby defining angular position of the at least one magnet relative to an initial angular position.

3. The flag actuation system according to claim 2, wherein each flag has at least one actuator magnet mounted thereon, and wherein a given flag is magnetically connected to the adapter part when the adapter part is arranged in an angular position where one of the magnets of the adapter part is aligned with an actuator magnet of the flag.

4. The flag actuation system according to claim 3, wherein the magnets of the adapter part and the actuator magnets of the at least two flags are arranged with substantially identical distance to the actuator axle.

5. The flag actuation system according to claim 3, wherein a position of the actuator magnet on a first flag differs from a position of the actuator magnet on a second flag.

6. The flag actuation system according to claim 5, wherein the positions of the actuator magnets on the at least two flags determine angular positions of the adapter part wherein respective actuator magnets are aligned with a magnet of the adapter part, the positions of the actuator magnets on the at least two flags thereby defining angular positions of the adapter part where respective flags are magnetically connected to the adapter part.

7. The flag actuation system according to claim 1, further comprising a first mechanical end stop and a second mechanical end stop, wherein the flags abut the first mechanical end stop when they are in the first position, and the flags abut the second mechanical end stop when they are in the second position.

8. The flag actuation system according to claim 7, wherein the first mechanical end stop and/or the second mechanical end stop is/are at least partly made from a magnetic or magnetizable material, and wherein each flag comprises a first retaining magnet establishing a first magnetic retaining connection with the first mechanical end stop when the flag is in the first position and a second retaining magnet establishing a second magnetic retaining connection with the second mechanical end stop when the flag is in the second position.

9. The flag actuation system according to claim 8, wherein a magnetic force defined by the magnetic actuator connection is larger than a magnetic force defined by the first magnetic retaining connection and larger than a magnetic force defined by the second magnetic retaining connection.

10. The flag actuation system according to claim 1, wherein the flag actuation system comprises at least three flags.

11. The flag actuation system according to claim 1, further comprising position determining means for determining the position of the flags and/or the actuator axle.

12. A lighting fixture comprising:
a base;
a yoke; and
a head, the head including:
a light source;
a gate;
a zoom and focus system; an exit lens; and
a flag actuation system;
wherein the flag actuation system comprises:
an actuator;
an actuator axle connected to and drivable by the actuator; and
at least two flags, each flag being movable between a first position in which the flag is arranged in an optical path through the flag actuation system, and a second position in which the flag is arranged out of the optical path;
wherein each flag is individually and detachably connectable to the actuator axle via a magnetic actuator connection, and each flag is retainable in the first position by means of a first magnetic retaining connection and in the second position by means of a second magnetic retaining connection.

13. The lighting fixture according to claim 12, wherein the flag actuation system is arranged along an optical axis of the head, between the light source and the exit lens.

14. A method for controlling a flag actuation system comprising an actuator, an actuator axle connected to and drivable by the actuator, and at least two flags, each flag being movable between a first position in which the flag is arranged in an optical path through the flag actuation system, and a second position in which the flag is arranged out of the optical path, wherein each flag is individually and detachably connectable to the actuator axle via a magnetic actuator connection, and each flag is retainable in the first position by means of a first magnetic retaining connection and in the second position by means of a second magnetic retaining connection, the method comprising the steps of:
selecting a combination of zero or more flags to be arranged in the optical path defined by the flag actuation system;
selecting a movement pattern of the actuator axle which results in the selected combination of zero or more flags being arranged in the optical path; and
operating the actuator to cause the actuator axle to move in accordance with the selected movement pattern.

15. The method according to claim 14, wherein the step of selecting the movement pattern comprises selecting the movement pattern among a set of predefined movement patterns.

* * * * *